United States Patent [19]

Coats et al.

[11] 4,285,365
[45] Aug. 25, 1981

[54] ROTARY VALVE FOR PRESSURE FLUID DISTRIBUTION

[75] Inventors: Graham C. Coats, St. Louis; Gary A. Elliott, Chesterfield; Michael A. Bulboaca, St. Louis, all of Mo.

[73] Assignee: Barry-Wehmiller Company, St. Louis, Mo.

[21] Appl. No.: 68,745

[22] Filed: Aug. 23, 1979

[51] Int. Cl.³ .............................................. F16K 11/02
[52] U.S. Cl. ........................... 137/625.15; 137/625.16
[58] Field of Search ...................... 137/625.11, 625.13, 137/625.15, 625.16; 134/129, 131; 222/485, 486, 553

[56] References Cited

U.S. PATENT DOCUMENTS

| | | | |
|---|---|---|---|
| 2,655,929 | 10/1953 | Herold | 137/625.47 X |
| 2,827,928 | 3/1958 | Guckel | 222/553 X |
| 3,111,131 | 11/1963 | Nekola et al. | 134/129 |
| 3,136,324 | 6/1964 | Yendley | 134/129 |
| 3,773,078 | 11/1973 | Suntheimel | 137/625.11 |
| 3,952,925 | 4/1976 | Babunovic et al. | 137/207 X |

Primary Examiner—William R. Cline
Attorney, Agent, or Firm—Gravely, Lieder & Woodruff

[57] ABSTRACT

A rotary valve for pressure fluid distribution to accomplish a sequential delivery of the pressure fluid to a series of outlets, in which a housing contains a stator having a semi-cylindrical face surface through which outlet ports open, and an elongated cylindrical rotor mounted for rotation adjacent the stator face, the rotor having a series of flow directing passages positioned to direct pressure fluid supplied to the interior of the housing through each of the outlet ports at least one at a time and in a predetermined sequence during rotation of the rotor. The arrangement of the fluid flow passages in the rotor, and the angular spacing of the passages around the circumference of the rotor is selected to minimize or avoid the destructive effect of water hammer by establishing a flow through a portion of a trailing port before a leading port effectively closes off the fluid flow.

5 Claims, 6 Drawing Figures

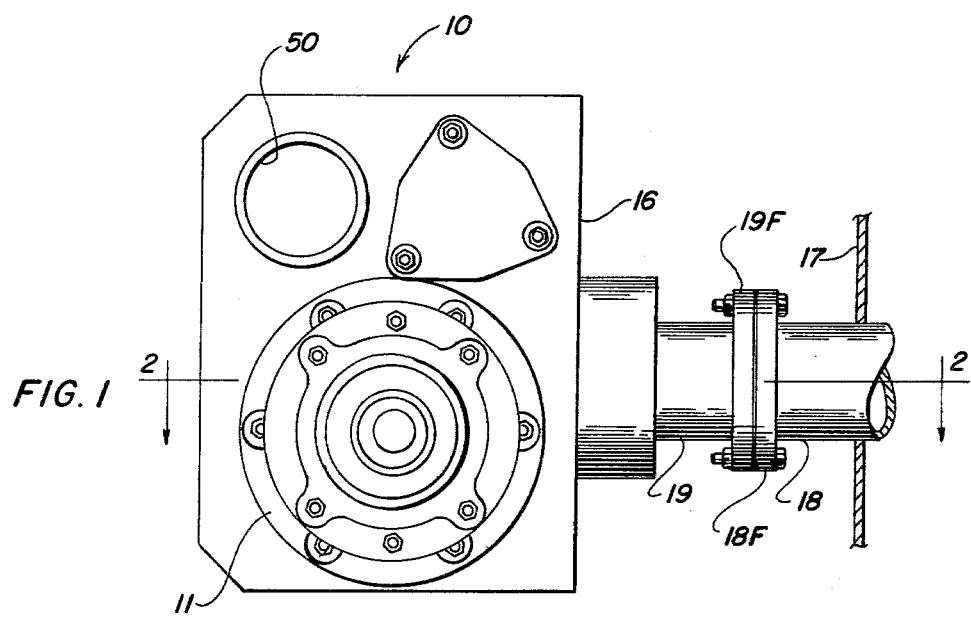
FIG. 1
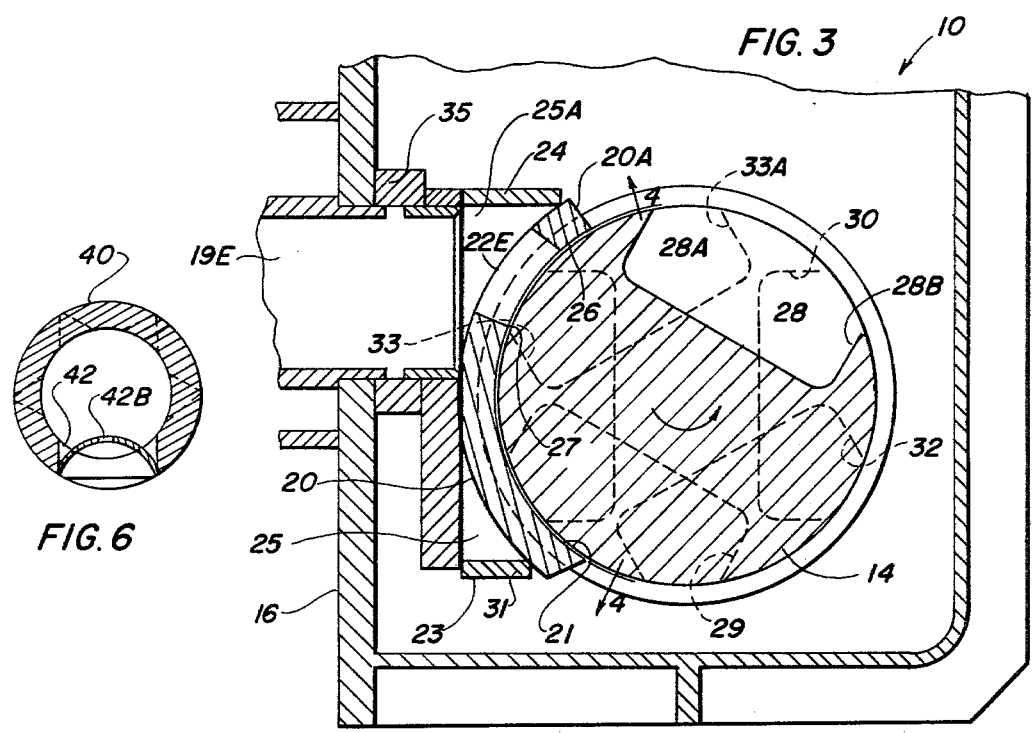
FIG. 3
FIG. 6
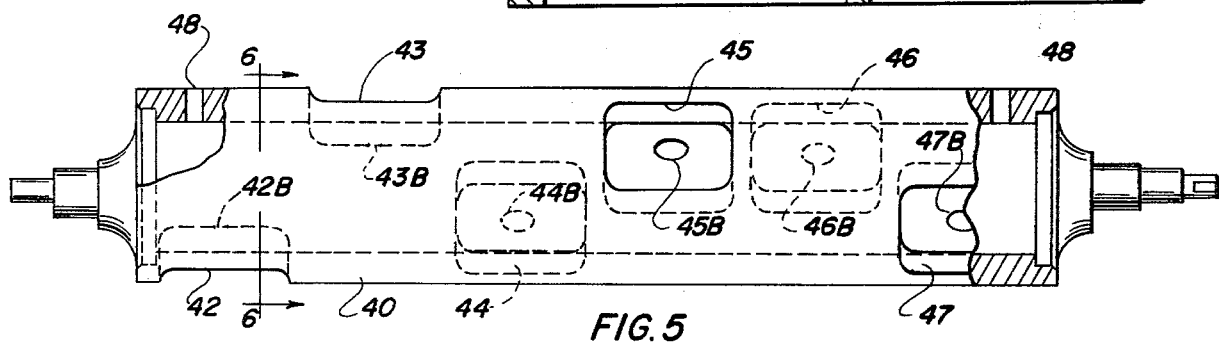
FIG. 5

ROTARY VALVE FOR PRESSURE FLUID DISTRIBUTION

BACKGROUND OF THE INVENTION

In the art of preparing containers for filling with beverages and food stuff, it is normal to subject the containers to washing solution projected at the containers under pressure so as to dislodge and remove foreign matter. Devices have been provided for container washing in which jets of washing solution under pressure have been created to thoroughly wash the interior and exterior of the containers. The jets of washing solution are normally intermittent so as to reduce the power required to generate the washing solution sprays and avoid chocking the container while obtaining an air/liquid scrubbing action. One said system is disclosed in Nekola U.S. Pat. No. 3,111,131 of Nov. 19, 1963, the showing being directed to the application of poppet valves and cam driven rocker members.

Another arrangement for controlling the flow of a fluid material under pressure is shown in Guckle U.S. Pat. No. 2,827,928 of Mar. 25, 1958 in which a rotary valve operates to distribute fluid material through a series of outlet ports in an intermittent stream, but because the fluid material is not supplied under an extremely high pressure there appears to be little need for considering the destructive effect generally associated with water hammer.

The prior art also includes the teaching in the U.S. Pat. No. of Herold 2,655,929 of Oct. 20, 1953 which is directed to apparatus for cleaning bottles by the rapid and forcible injection of large volumes of cleaning liquid through the mouth of the bottles, and concurrently directing a counterbalancing stream of fluid against the exterior of the bottles so as to avoid displacing the bottles from the carriers moving the bottles through the cleaning machine. In this patent a hollow cylindrical control valve is provided with a series of diametrically opposite outlet ports for simultaneously releasing pressure fluid in order to effect the counterbalancing action of an external jet of fluid opposing an internal jet of fluid.

The disclosure in Yendley U.S. Pat. No. 3,136,324 of June 9, 1964 is directed to container rinsing apparatus in which a series of fluid flow passages in a housing are sequentially put into communication with a fluid supply channel of helical configuration formed in the periphery of a rotor so that jets of fluid can be created to travel at the speed of the containers for continuous jetting rather than intermittent jetting.

A more recent rotary valve arrangement is disclosed in Babunovic et al. U.S. Pat. No. 3,952,925 of Apr. 27, 1976 wherein the water hammer or shock produced upon quick shut off of the flow of pressure fluid is absorbed by a pressure responsive collapsible flexible wall bladder.

These examples of the prior art are not particularly suitable for the high speed container cleaning apparatus in current use, and it has been found necessary to improve the cleaning function by creating a rapid series of jets at a considerably higher frequency than is found to be possible with the means available in the prior art. The increase in the need for high speed jets of pressure fluid has been obtained in the present rotary valve through controlling water hammer by providing means to maintain a minimum uninterrupted flow at all times during the opening and closing of the principal fluid passages at high speed.

BRIEF DESCRIPTION OF THE INVENTION

The present invention is directed to improvements in rotary valves for pressure fluid distribution, and is principally concerned with delivery of container washing solution in a high speed series of jets substantially free of shock reaction or water hammer.

It is an important object of the present invention to improve upon the shortcomings of the prior art devices which have been heretofore provided for flow control valves operating in a system for delivering pressure fluid in short timed bursts.

A further important object of the present invention resides in the provision of a fluid pressure rotary valve for distributing a fluid under pressure to a plurality of outlets where the pressure fluid originates from a common source and is required to be distributed at high speed through the plurality of outlets, while avoiding destructive shock effects normally associated with sudden blockage of the flow.

Other objects and advantages of the present invention will be set forth in the following description of certain preferred embodiments.

BRIEF DESCRIPTION OF THE DRAWINGS

The preferred embodiments of the present invention are shown in the accompanying drawings, wherein:

FIG. 1 is an end elevation as seen at the inlet end of the housing assembly for the rotary valve of the present embodiment with the drive means omitted;

FIG. 3 is a transverse sectional detail taken along the section line 3—3 in FIG. 2;

FIG. 5 is a view illustrating a modified rotor; and

FIG. 6 is a sectional view of a rotor pocket and cup, the view being taken along line 6—6 in FIG. 5.

DETAILED DESCRIPTION OF THE EMBODIMENTS

Figure 2:
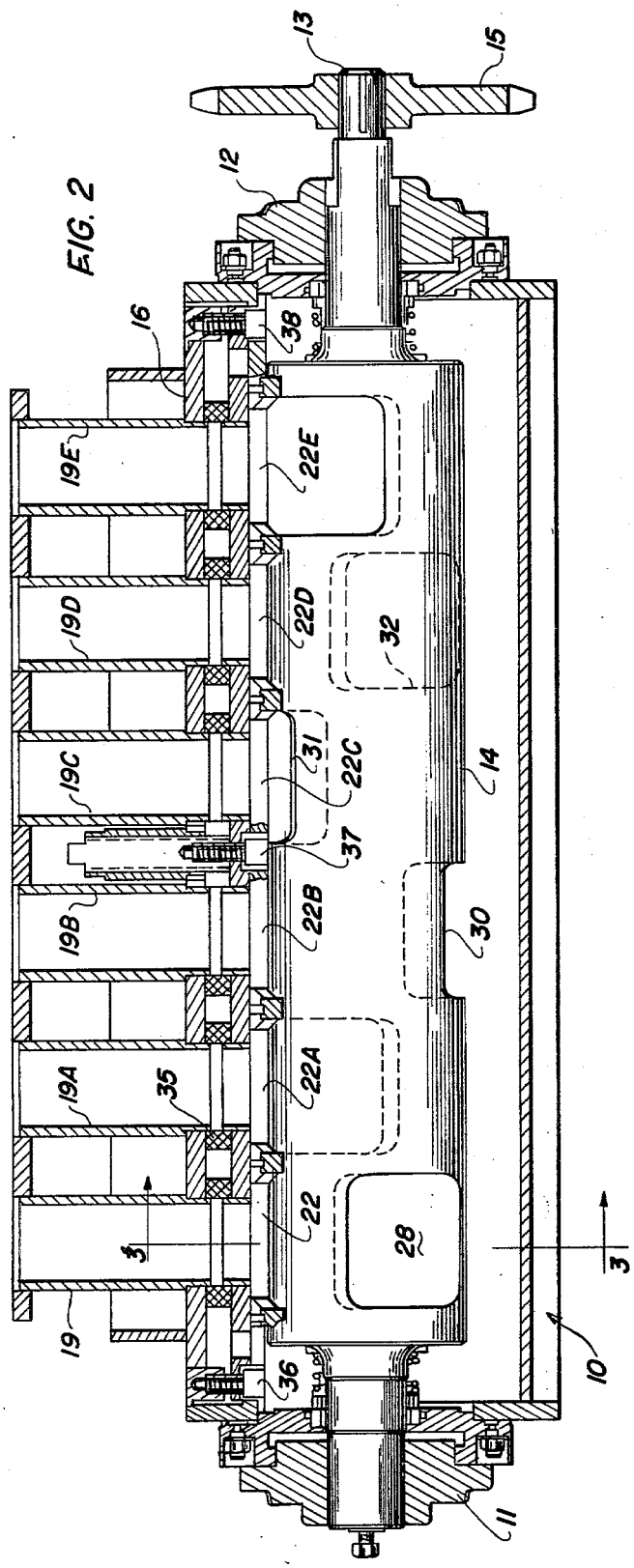
FIG. 2 is a longitudinal sectional view of the housing and rotary valve assembly, the view being taken along line 2—2 in FIG. 1 and with the drive means in place.

In general the rotary valve assembly is illustrated in FIGS. 1 and 2 to comprise an elongated housing 10 closed at its opposite ends by bearing adaptor assemblies 11 and 12 respectively. The bearing adaptor 12 is arranged to permit the shaft 13 operably connected to the rotary valve 14 to project through to the exterior where drive means 15 may be conveniently attached. The housing 10 is provided with a wall 16 which is spaced from the wall 17 of a tank assembly (not shown) which is part of a container washing apparatus (not necessary to illustrate). The wall 17 is provided with fluid connectors 18 which are equal in number to the cooperating fluid connectors 19 extending outwardly from the wall 16 of the housing 10. The respective connectors 18 and 19 are joined by bolted together flanges with intervening gasket seals (not shown).

Figure 4:
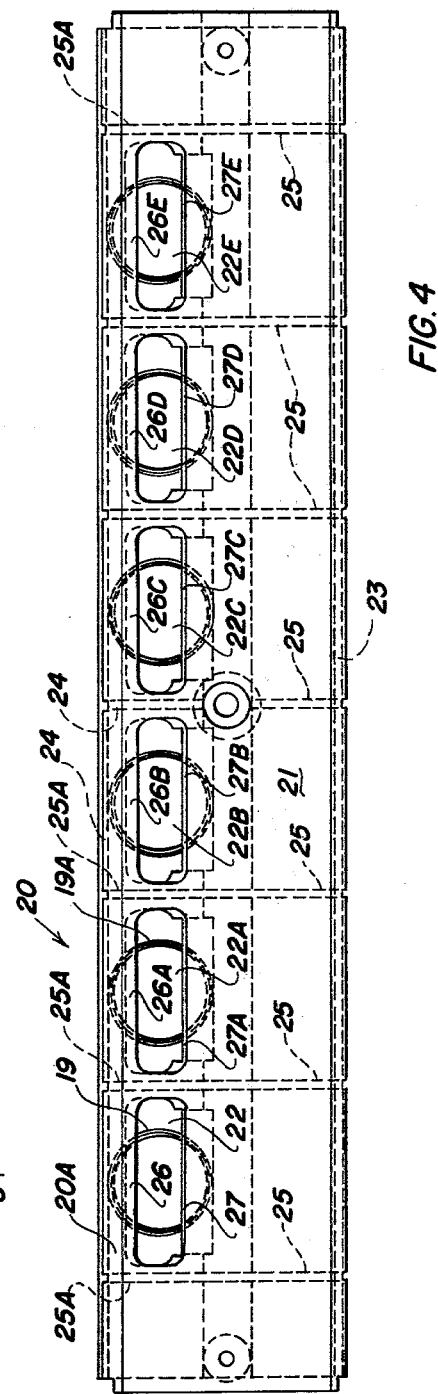
FIG. 4 is a fragmentary sectional elevational view taken along the line 4—4 in FIG. 3 illustrating the face surface of the ported stator.

While the view of FIG. 2 shows the housing 10 to be provided with six fluid outlets 19 through 19E, the view in FIG. 3 is to be considered as representative of the internal assembly of components which cooperate between the body of the rotary valve 14 and the respective fluid outlets typically such as outlet 19. In FIG. 3, the interior of the housing 10 suitably supports a stator 20 which is formed (FIG. 4) with a cylindrically shaped face 21 penetrated by a series of ports 22, 22A, 22B, 22C, 22D and 22E, each having a predetermined dimension as measured circumferentially of the face 21. It is understood that the stator 20 extends longitudinally through the housing 10 and is supported by being secured to welded-in-place lower plate 23 and upper plate 24. As shown in FIG. 4, the face 21 of the stator 20 has its respective ports 22 through 22E aligned with the respective fluid connector outlets 19, 19A, 19B, 19C, 19D and 19E. Each of the ports 22 to 22E is isolated from the others by rib-like baffles 25 adjacent the lower plate 23 and other rib-like baffles 25A are disposed adjacent the upper plate 24 so that when one of the ports 22 to 22E is in full fluid flow connection with the interior of the housing 10 the remaining ports are cut off for a short time in the motion of the rotor 14.

In view of the provision for multiple outlets at fluid connectors 19 through 19E, and controlling the multiple outlets in a predetermined sequence by a single rotary valve body 14, the present improvement is arranged to eliminate need for a flexible walled expandable-collapsible means, such as is shown in Babunovic et al. U.S. Pat. No. 3,952,925, thereby eliminating the problem of deterioration of such a device which is intended to absorb the shock of water hammer. The present arrangement takes care of water hammer shock in a unique manner that is shown in FIGS. 3 and 4. In FIG. 4 the stator 20 is shown in elevation so that the view is taken looking directly into the respective ports 22 through 22E. This view also shows the leading edge 20A of the stator which extends throughout the full length, and between the leading edge 20A and each of the ports 22 through 22E there is a short circumferential section associated with each of the ports, and these circumferential sections are indicated at 26, 26A, 26B, 26C, 26D and 26E. The actual port begins at the cut off edge of the circumferential section 26 through 26E and continues to the cut off margin at 27 for port 22 and similar cut off margins 27A through 27E for the other ports.

Referring now to FIG. 3 the rotor 14 is shown to be formed with a series of pockets 28, 29, 30, 31, 32 and 33 circumferentially distributed around the body of the rotor 14 and also distributed axially therealong (see FIG. 2). In the view of FIG. 3 the rotor pocket 33 is shown in dotted outline as having been moved to uncover the outlet port 22E in the stator 20 while also being in communication with the interior of the housing 10 in advance of the leading edge 20A of the stator. As the rotor continues to rotate in a counter clockwise direction the next pocket, 28 shown in full line will be advanced toward the leading edge 20A while the preceeding pocket 33 has its trailing margin 33A closing up on the leading edge 20A. The amount of angular overlap between pockets 33 and 28 is sufficiently greater than the circumferential extent of the stator sections 26 to allow fluid flow communication from the interior of the housing to enter the outlet port 22 associated with pocket 28 before the trailing edge 33A of the pocket 33 closes off communication with the interior of the housing. Thus, continuity of flow of the pressure fluid is maintained and water hammer is not generated. This action of the rotor pockets in relation to the configuration of the stator 20 controls the continuity of flow through each of the stator ports without stopping flow at any time during the rotation of the rotor 14. It is to be noted in FIG. 3 that the stator leading edge 20A extends the full length of the stator, and the entrance edge to the ports 22 through 22E is spaced from the edge 20A the circumferential distance of the surfaces 26 to 26E respectively.

The rotor 14 illustrated in FIGS. 2 and 3 is made up of a single solid body having recesses or pockets 28, 29, 30, 31, 32 and 33. These pockets are distributed lengthwise of the axis of the rotor 14 and are spaced circumferentially in an arrangement intended to achieve substantial balance in the effect of the pressure fluid on the rotor body. For example, let it be assumed that the pocket 33 is in fluid flow communication with its associated port 22E. The next pocket to be moved into fluid flow would be pocket 28 associated with port 22. The fluid flow relationship of the remaining pockets with associated ports would then follow in order with pockets 30, 32, 29 and 31.

Turning again to FIG. 3 it can be seen that as the trailing edge 33A of pocket 33 approaches the lip 20A of the stator 20, the leading edge 28A of pocket 28 leads the trailing edge 33A of pocket 33 by a circumferential measurement which is greater than the circumferential distance along the face 26 of the stator 20 between the edge 20A and the cut off edge of the circumferential section 26. This dimensional relationship applies to all of the pocket formed in the rotor 14 with respect to the associated ports 22, thereby allowing the next trailing pocket, as pocket 30, to be in fluid flow association with its port 22B before the trailing edge 22B of pocket 28 arrives at the edge 20A of the stator 20 to cut off immediate flow of fluid through that pocket. It can now be appreciated that during the rotation of the rotor body 14 the arrangement of fluid flow pockets 28 through 33 is such that the pockets overlap so that at no time is there a complete cessation of flow of fluid through any of the fluid connector outlets 19. Accordingly, pressure shock or water hammer is effectively suppressed without detracting from the desired delivery of washing solution through the several fluid connector outlets 19 through 19E.

In FIG. 1 it can be seen that the wall 16 of the housing 10 is equipped with fluid connectors 19 through 19E, each one being associated with a fluid connector 18 such as the one seen in FIG. 1. The connectors are associated with a flange plate 19F which connects to a mating flange plate 18F. The respective inner ends of the connectors 19–19E are sealed near the back of the stator 20 by suitable gasket 35 (see FIGS. 2, 3), while the stator 20 is held in position relative to the housing wall 16 by three spaced attachment elements 36, 37 and 38. These elements are adapted to secure the stator 20 in a straight line position so its concave face 21 will properly receive or mate with the cylindrical shape of the rotor 14.

Turning now to FIG. 5, it can be seen that the modified rotor body 40 is formed with a hollow interior space 41 which is in communication at all times with all of the pocket receiving openings 42, 43, 44, 45, 46 and 47 distributed along the axial length of the rotor body 40. During rotation of the rotor body 40 where the openings 42 through 47 inclusive register with the associated ports 22 in the stator 20 there is established an internal pressure fluid transfer as the respective pockets are arranged in flow relation internally of the body 40, rather than in overlapping relation for the rotor body 14 shown in FIG. 3.

In FIG. 6 there is shown a typical rotor pocket 42A installed in the opening 42 of the rotor 40. The element is cup-shaped and has a hole 42B in the bottom which opens to the interior. It is thought from this that it will be understood each receiving opening 43 through 47 will be provided with a similar pocket having a hole opening to the rotor interior. In addition to the holes in each cup-shaped pocket, the body 40 of the rotor exposed to the interior of the housing 10 is formed with vent openings 48 which establish pressure fluid flow between the housing 10 and the rotor interior, and also provide for suppressing water hammer. Rotor 40 does not need to have its pockets arranged in overlapping position, as the action of overlapping pockets is accomplished by flow communication within the rotor to all of the pockets.

Reference has been made to the disclosure in FIG. 1 being a view at the inlet end of the housing assembly 10. The inlet opening is shown at 50, but it should be appreciated that the inlet provision for the supply of pressure fluid from a suitable source could be at the opposite end of the housing 10 or at some other convenient connection formed in a side wall of the housing.

The present rotary valve assembly and its modification avoids the problems arising in connection with the use of a flexible bladder device as shown in the prior patent of Babunovic et al. U.S. Pat. No. 3,952,925 of Apr. 27, 1976. In that prior assembly the frequency of valve opening and closing induced fatigue failure in the bladder and that in turn created structural fatigue in the housing assembly and in the rotor. The present arrangement avoids the necessity for using a flexible bladder for absorbing shock and water hammer effects by arranging the fluid flow pockets in the rotary valve body so that they either overlap circumferentially so as to avoid shutting off fluid flow, or they maintain fluid communication internally of the rotary valve body for the purpose of avoiding the development of pressure shocks or water hammer which arise when flow under pressure is suddenly terminated.

What is claimed is:

1. A pressure fluid rotary valve for distributing a pressure fluid to a plurality of outlets from a common source, said rotary valve comprising: an elongated housing, a pressure fluid supply connected to said housing, a plurality of fluid outlet connectors spaced apart along the length of and opening outwardly from said housing, and means in said housing cooperating with said outlet connectors for controlling the distribution of the pressure fluid to said outlet connectors in a predetermined order and for establishing continuous flow of pressure fluid, said means including, a stator positioned in said housing adjacent said connectors and presenting to the interior of said housing a face surface which is a segment of a circle, said face surface being formed with a leading edge and a plurality of outlet ports spaced from said leading edge a uniform distance to provide a section of said face surface in advance of each of said outlet ports, means between said stator and said connectors forming separate spaces between said outlet ports and connectors such that each outlet port is in flow registration with a single connector, and an elongated valve body having a cylindrical form and rotatively mounted in said housing in position to make a working fit at said stator face surface, said valve body being formed with fluid flow controlling pockets spaced along the length thereof in position during body rotation to register with said outlet ports, the arrangement of said flow control pockets in said valve body being such as to assure the establishment of said continuous flow of pressure fluid and said predetermined order of distribution of the pressure fluid through said valve body pockets, the predetermined order assuring substantial freedom from bending of said valve body by the effect of the pressure fluid along the length thereof and simultaneous delivery of a series of fluid jets timed in bursts as each pocket passes an associated section of said stator face surface in its advance into registering with an associated outlet port.

2. The rotary valve of claim 1, wherein said fluid flow controlling pockets in said valve body are positioned in an overlapping relationship as measured circumferentially of said valve body, said overlap being greater than the circumferential extent of said section of said stator face surface in advance of said outlet ports.

3. The rotary valve of claim 1, wherein said valve body is internally hollow, and each of said flow controlling pockets is formed with an opening providing communication between the hollow interior thereof and said housing interior to assure said continuous flow of pressure fluid.

4. The rotary valve of claim 1, wherein said flow controlling pockets each have leading and trailing edges, and said leading edges of said pockets lead the trailing edges of predetermined others of said pockets by an amount greater than the circumferential extent of said section of said stator face surface.

5. The rotary valve of claim 1, wherein said valve body is solid and said pockets are sized to open through the rotor periphery and extend over a portion of its circumference to overlap the circumferential extent of two other pockets by an amount greater than the circumferential extent of said section of said stator face surface.

* * * * *